(12) United States Patent
Leedy

(10) Patent No.: US 10,084,358 B1
(45) Date of Patent: *Sep. 25, 2018

(54) PORTABLE SOUND ATTENUATING DEVICE AND RELATED METHODS

(71) Applicant: ZOMBIEBOX INTERNATIONAL LLC, Mesa, AZ (US)

(72) Inventor: Timothy David Leedy, Mesa, AZ (US)

(73) Assignee: Zombiebox International LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,021

(22) Filed: May 2, 2017

Related U.S. Application Data

(63) Continuation of application No. 15/002,270, filed on Jan. 20, 2016, now Pat. No. 9,641,043.

(60) Provisional application No. 62/141,149, filed on Mar. 31, 2015, provisional application No. 62/139,639, filed on Mar. 27, 2015.

(51) Int. Cl.
*H02K 5/24* (2006.01)
*E06B 7/084* (2006.01)

(52) U.S. Cl.
CPC ............... *H02K 5/24* (2013.01); *E06B 7/084* (2013.01)

(58) Field of Classification Search
CPC .................................. H02K 5/24; E06B 7/084
USPC ......................................................... 181/202
See application file for complete search history.

(56) References Cited

U.S. PATENT DOCUMENTS

| | | | |
|---|---|---|---|
| 2,927,665 A | * | 3/1960 | Hauf ..................... E04B 1/6803 181/290 |
| 3,794,377 A | | 2/1974 | Wachsmuth et al. |
| 3,856,439 A | | 12/1974 | Moehrbach |
| 3,951,228 A | | 4/1976 | Schnell |
| 4,608,946 A | | 9/1986 | Tanaka et al. |
| 4,827,147 A | | 5/1989 | Mizushima |
| 4,871,922 A | | 10/1989 | Heinrich et al. |
| 5,123,874 A | | 6/1992 | White |
| 5,672,052 A | | 9/1997 | Ishida |
| 5,850,061 A | | 12/1998 | Klompenhouwer et al. |
| 5,857,439 A | | 1/1999 | Will et al. |
| 5,929,394 A | | 7/1999 | Westerbeke |
| 5,977,667 A | | 11/1999 | Hirose |

(Continued)

FOREIGN PATENT DOCUMENTS

| | | |
|---|---|---|
| WO | 2010060482 | 6/2010 |
| WO | 2011128451 | 10/2011 |

OTHER PUBLICATIONS

"How to Reduce the Noise of a Portable Generator," http://www.doityourself.com/stry/how-to-reduce-the-noise-of-a-portable-generator (last visited Sep. 6, 2016).

(Continued)

*Primary Examiner* — Forrest M Phillips
(74) *Attorney, Agent, or Firm* — IPTechLaw

(57) ABSTRACT

Implementations of a portable soundproofing enclosure may include: four side panels coupled together, a top panel coupled to each of the four side panels, the four side panels and the top panel, the top panel including a fan. The panels may form a cavity sized to fully enclose a portable generator. At least two of the four side panels may include an air dam. At least one of the side panels may have a plurality of louvers configured to allow air to be drawn through the panel. The bottom edges of the sides may be configured to rest on a mat.

18 Claims, 9 Drawing Sheets

(56) References Cited

U.S. PATENT DOCUMENTS

| | | | |
|---|---|---|---|
| 6,100,599 | A | 8/2000 | Kouchi et al. |
| 6,793,465 | B2 | 9/2004 | Stallings |
| 6,975,042 | B2 | 12/2005 | Yamada et al. |
| 7,490,697 | B1 | 2/2009 | Williamson, Jr. |
| 7,642,665 | B2 | 1/2010 | Konop et al. |
| 7,902,705 | B2 | 3/2011 | Gravlin et al. |
| 8,069,947 | B2 | 12/2011 | Quasney |
| 8,136,626 | B1 | 3/2012 | Aliev |
| 8,544,596 | B2 | 10/2013 | Dupont |
| D731,971 | S | 6/2015 | Andren |
| 9,641,043 | B1 * | 5/2017 | Leedy ................ E06B 7/08 |
| 2006/0144637 | A1 | 7/2006 | Swartz et al. |
| 2006/0185931 | A1 | 8/2006 | Kawar |

OTHER PUBLICATIONS

"Soundproofing a Generator or a Pump," http://www.soundproofing.org/infopages/generator.htm (last visited Sep. 6, 2016).

Matt Boughan, "Soundproofing Small, Loud Machines: Generator and Air Compressor Noise," Feb. 14, 2012, https://acousticalsolutions.com/soundproofing-small-loud-widgets/ (last visited Sep. 6, 2016).

* cited by examiner

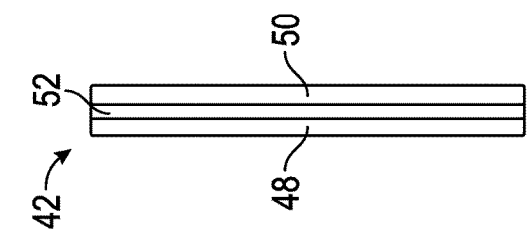
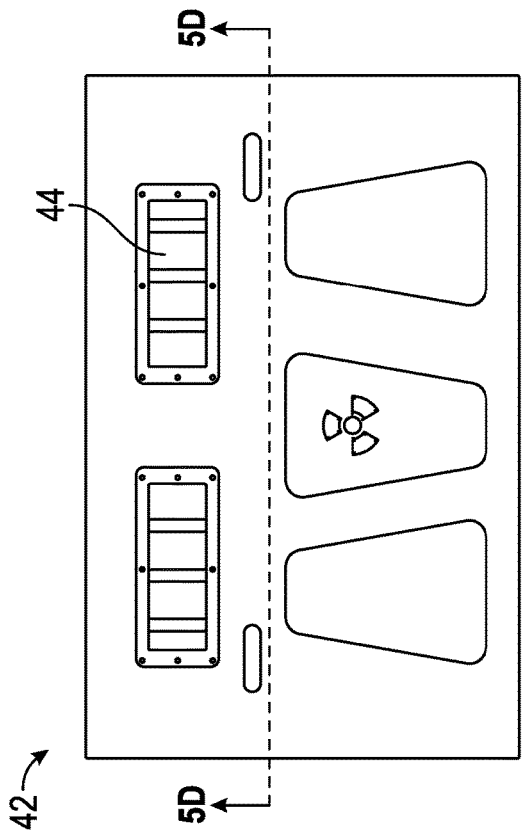
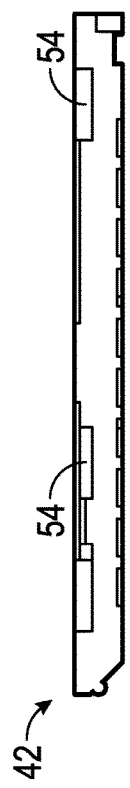
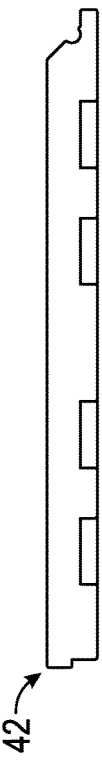
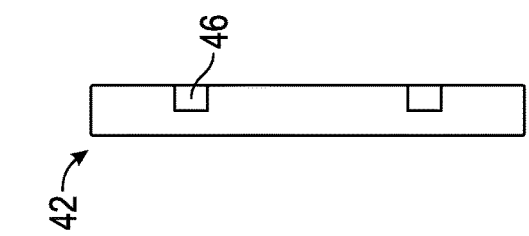

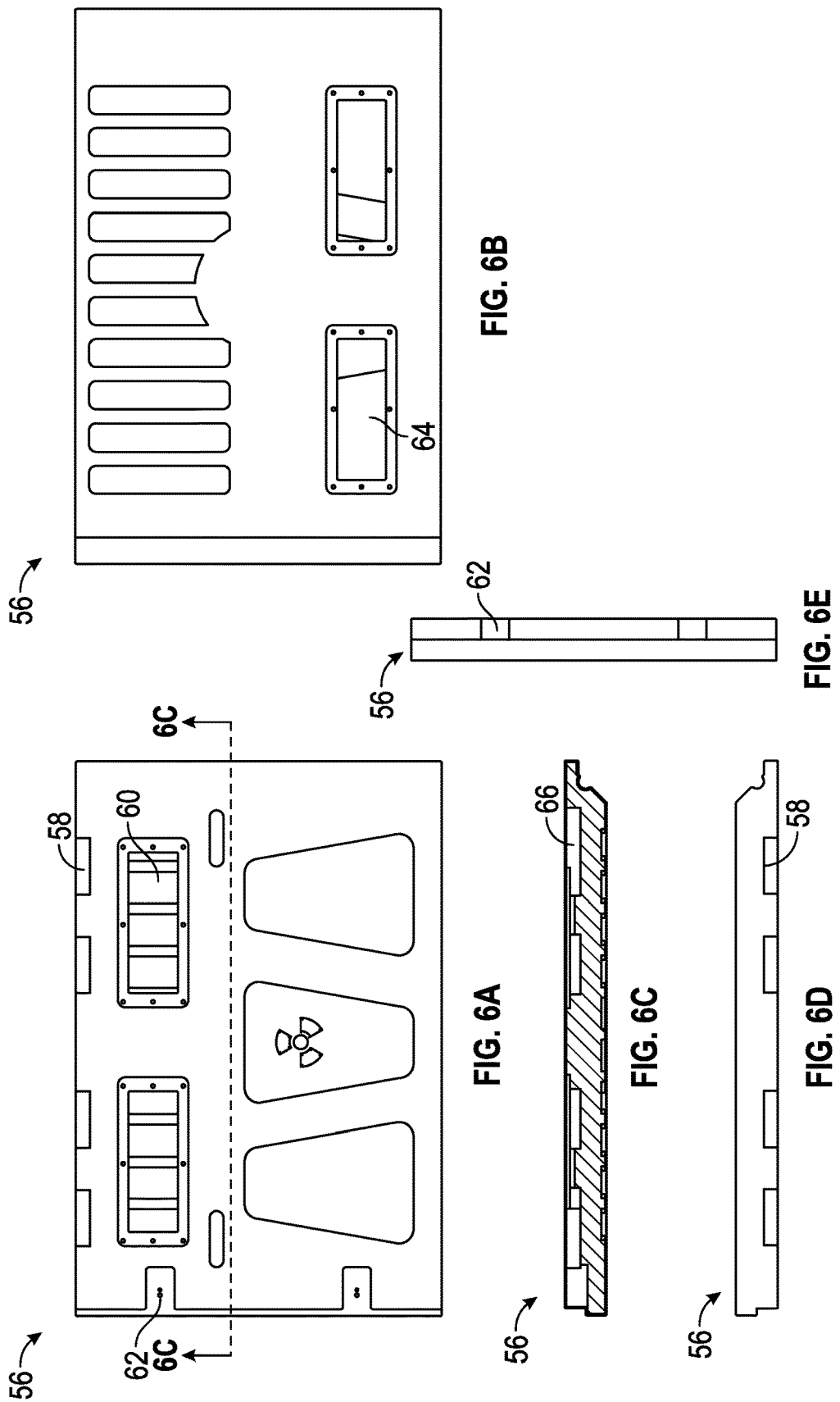

PORTABLE SOUND ATTENUATING DEVICE AND RELATED METHODS

CROSS REFERENCE TO RELATED APPLICATIONS

This application is a continuation application of the earlier U.S. Utility Patent Application to Timothy David Leedy entitled "Portable Sound Attenuating Device and Related Methods," application Ser. No. 15/002,270, filed Jan. 20, 2016 now pending, which claimed the benefit of the filing date of U.S. Provisional Patent Applications 62/139,639 and 62/141,149 entitled "Portable Sound Attenuating Device and Related Methods" to Dave Leedy which were filed on Mar. 27, 2015 and Mar. 31, 2015, respectively, the disclosures of each of which are hereby incorporated entirely herein by reference.

BACKGROUND

1. Technical Field

Aspects of this document relate generally to portable soundproofing enclosures, such as enclosures used for decreasing the sound of a generator.

2. Background

Conventionally, using a generator to provide power in remote locations or during an emergency creates a lot of sound. Conventional soundproofing enclosures have been devised that are fixed to the generator which serve to attenuate the noise. Other conventional soundproofing enclosures are built at a location attached to the ground and the generator is placed inside.

SUMMARY

Implementations of a portable soundproofing enclosure may include: four side panels coupled together, a top panel coupled to each of the four side panels, the four side panels and the top panel, the top panel including a fan. The panels may form a cavity sized to fully enclose a portable generator. At least two of the four side panels may include an air dam. At least one of the side panels may have a plurality of louvers configured to allow air to be drawn through the panel. The bottom edges of the sides may be configured to rest on a mat.

Implementations of a portable soundproofing enclosure include one, all, or any of the following:

The air dam may be formed from two walls comprised in each of the at least two of the side panels.

There may be foam coupled to each of the two walls of the air dam.

There may be supports between the two walls of the air dam.

The panels may include a material selected from the group consisting of wood, metal, thermoplastics, plastics or any combination thereof.

The side panels may be formed through injection molding.

The plurality of louvers may include one of metal, plastic, or any combination thereof.

Implementations of a portable soundproofing enclosure may include: four side panels coupled together, a top panel coupled to the four side panels and having a fan coupled thereto, and a mat removably coupled to a side of each of the four side panels opposing the top panel. The four side panels may form a cavity sized to fully enclose a portable generator. At least one of the panels may have a plurality of louvers configured to allow air to be drawn through the panel.

Implementations of a portable soundproofing enclosure include one, all, or any of the following:

The air dam may be formed from two walls comprised in each of at least two of the four side panels.

The foam may be coupled to each of the two walls of the air dam.

There may be supports between the two walls of the air dam.

The panels may include a material selected from the group consisting of wood, metal, thermoplastics, plastics, or any combination thereof.

The side panels may be formed through injection molding.

The louvers may include one of metal, plastic or any combination thereof.

Implementations of a portable soundproofing enclosure may include: at least three interlocking side panels, a top panel coupled to the at least three interlocking side panels, the top panel comprising a fan, and a mat removably coupled to the at least three interlocking side panels. The at least three interlocking panels and the top panel form a cavity sized to enclose a portable generator. At least one of the at least three interlocking side panels comprises a plurality of louvers therein to allow air to be drawn through the panel.

Implementations of a portable soundproofing enclosure include one, all, or any of the following:

The air dam may be formed from two walls included in each of at least two of the four side panels.

The fan may be a centrifugal fan.

The louvers may be movable.

The louvers may include at least one of metal, plastic and any combination thereof.

The mat may include a material selected from the group consisting of neoprene, rubber, plastic, and any combination thereof.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 5A is a front view of a side panel of the device;

FIG. 5B is right side view of the side panel showing where the hinges attach to the side panel;

FIG. 5C is a left side view of the side panel showing the double walls on the panel;

FIG. 5D is a section view of the side panel taken along line 5D in FIG. 5A;

FIG. 5E is a top view of the side panel;

FIG. 6A is a front view of another side panel of the device;

FIG. 6B is a back view of the other side panel of the device;

FIG. 6C is a sectional view of the other side panel taken along sectional line 6C in FIG. 6A;

FIG. 6D is a top view of the other side panel;

FIG. 6E is a left side view of the other side panel;

DESCRIPTION

This disclosure, its aspects and implementations, are not limited to the specific components, assembly procedures or method elements disclosed herein. Many additional components, assembly procedures and/or method elements known in the art consistent with the intended portable soundproofing enclosure (device) will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such devices, and implementing components and methods, consistent with the intended operation and methods.

Figure 1:
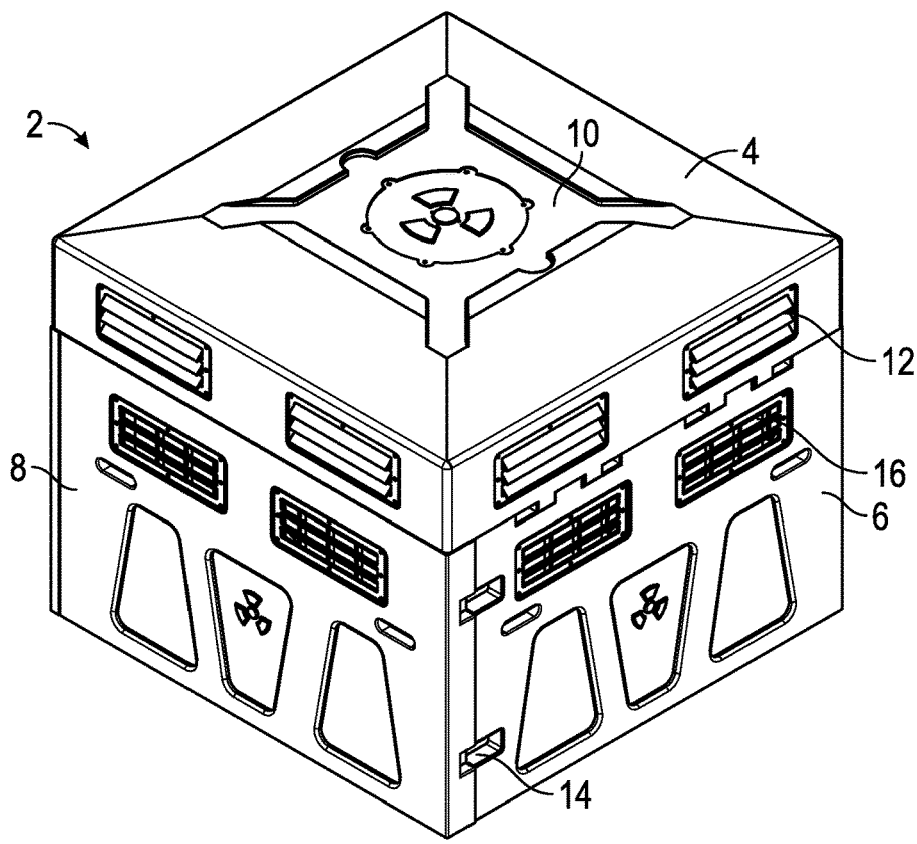
FIG. 1 is a perspective view of the portable soundproofing enclosure (device)

FIG. 1 illustrates a perspective view of one implementation of the device 2. The device is a portable soundproofing enclosure that can be transported to a location where a generator is to be used, assembled and placed over the generator. The top panel of the device 4 is coupled to the interlocking side panels 6 and 8. The top panel 4 and side panels 6 and 8 form a cavity sized to fully enclose a portable generator. As there are different sizes of portable generators, the various panels 4, 6, 8 may be of corresponding dimensions to allow the cavity to be appropriately sized. On the top panel of the device 4 is a fan 10 (below the surface of top panel 4). The fan is used to push the exhaust air out the louvers 12 in the top panel 4. The louvers 12 may be self-closing when the fan 10 is turned off. This is done by having the louvers 12 rotate about axles or pins coupled to openings in the top panel 4 and have the force of the exhaust air from the fan 10 be sufficient to keep the louvers in an open position. When the fan 10 stops running, the weight of the louvers 12 may be designed to cause the louvers 12 to rotate to a closed position under gravity force. In various implementations, the fan 10 is powered by the generator itself. In those implementations where movable louvers are used, if the fan 10 fails and stops operating while the generator continues to operate, the louvers will close. Because of this, the generator may consume the available combustion oxygen inside the enclosure before the generator overheats, causing the generator to "choke out" or stop operating. This feature of the device may increase the safety of the device and provide a fail-safe overheating control system for the device.

The side panels of the device 6 and 8 may be coupled together by non-limiting example by latches, hinges 14, or other fasteners. The hinges 14 allow the side panels 6 and 8 to be folded together for easy storage and transportation of the device. The side panels 6 and 8 have a plurality of louvers 16 configured to allow air to be drawn through the panel. The top panel 4 and side panels 6 and 8 may be formed from wood, metal, thermoplastics, plastics or any combination thereof.

Figure 2:
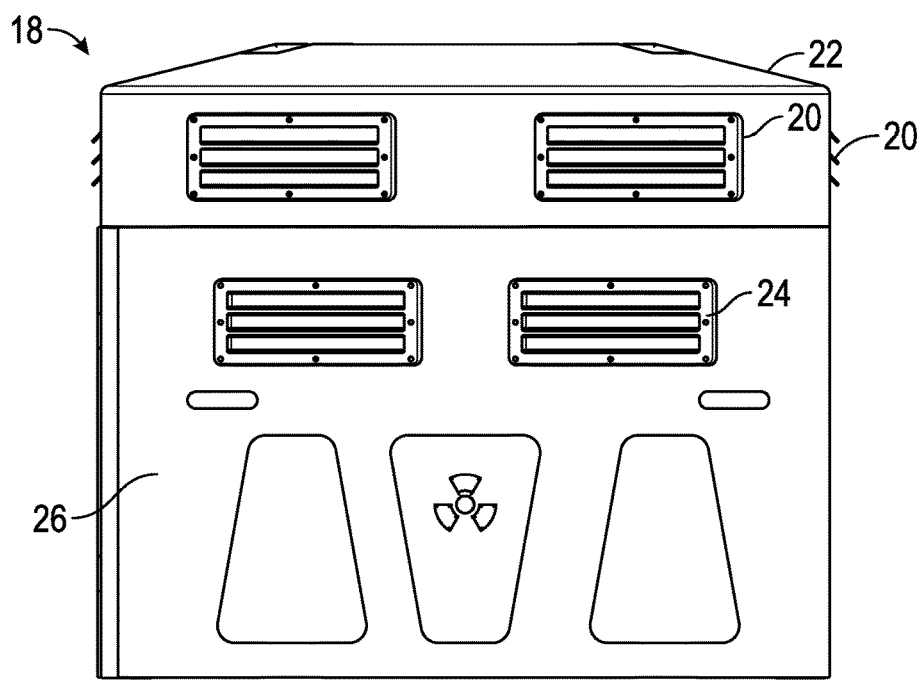
FIG. 2 is a front view of the device.
Figure 3:
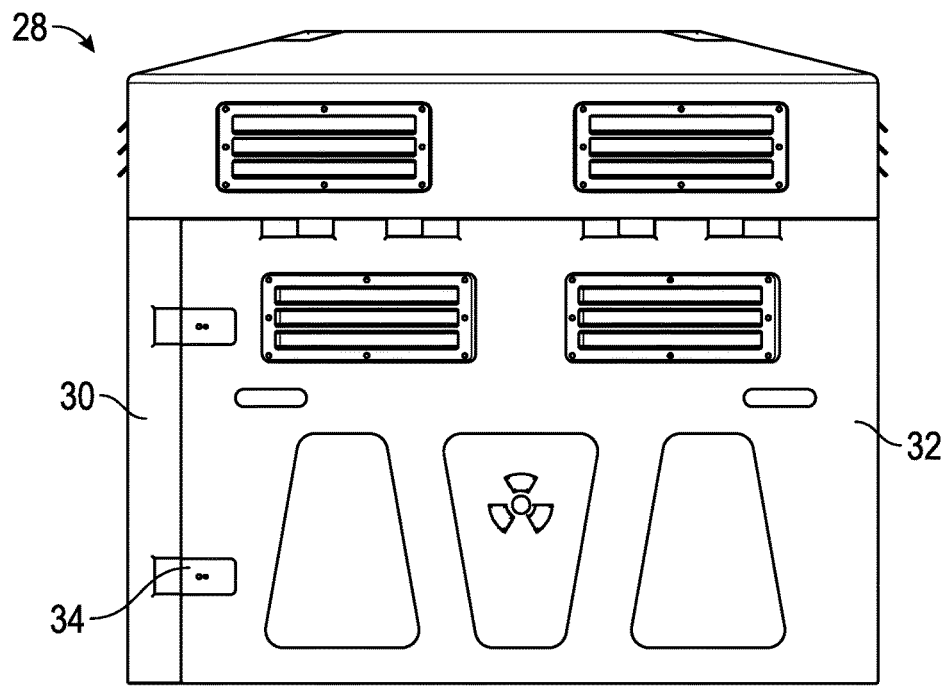
FIG. 3 is a side view of the device.
Figure 4:
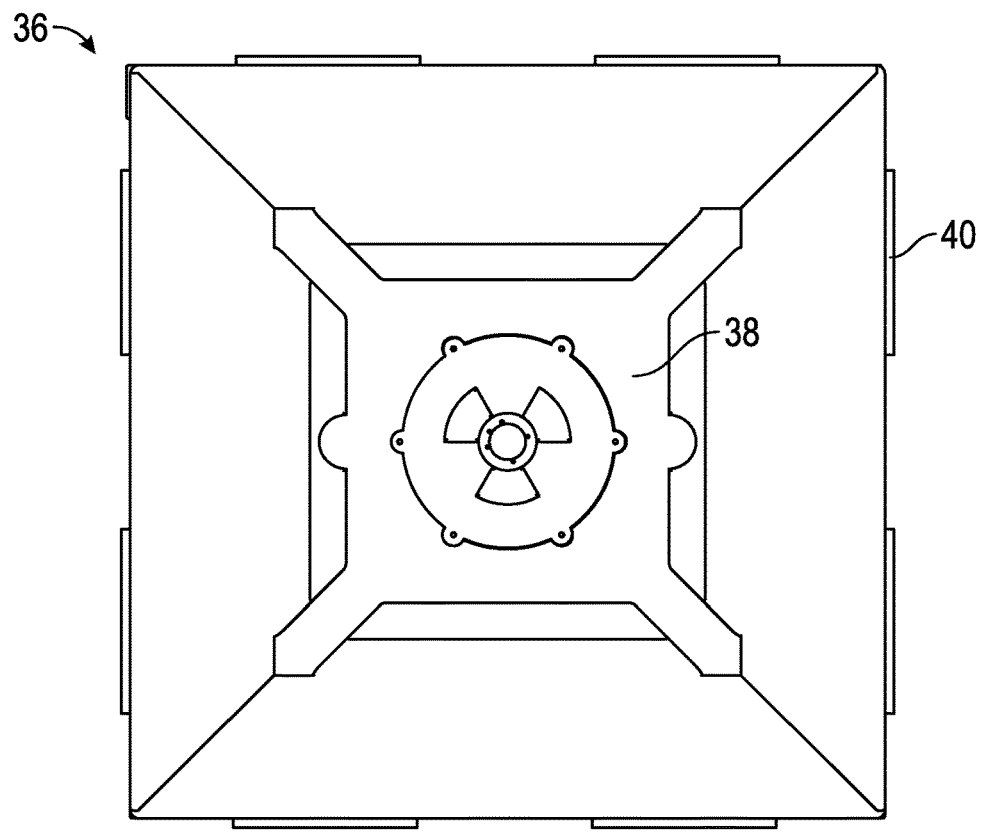
FIG. 4 is a top view of the device.

Referring to FIG. 2, a front view of the device 18 is illustrated. This figure illustrates the louvers 20 on the top panel of the device 22 and louvers 24 on the side panels of the device. The louvers 20 allow air to flow out of the device to ventilate the generator within the device 18. Referring to FIG. 3, a side view of the device showing where the side panels 30 and 32 may be coupled together with hinges or latches 34 is illustrated. Referring to FIG. 4, a top view of the device 36 showing the position of the fan 38 and top view of the louvers 40 is illustrated.

Referring to FIG. 5A, a front view of a side panel 42 of the device is illustrated showing louvers 44. FIG. 5B is a right side view of the side panel 42 of the device showing, by non-limiting example, the location of a hinge 46 where the side panel may be coupled to another side panel. FIG. 5C is a left side view of the side panel 42 of the device. FIG. 5C illustrates where an air dam 52 is formed from two walls 48 and 50 in each of at least two of the side panels 42. The air dam 52 helps to muffle the sound of a generator enclosed within the device. The operation of the air dam 52 is to create a non-line of sight path for the sound waves from the generator to travel before exiting the walls 48, 50. In this way, the sound waves are forced to reverberate against the walls of the air dam 52 and dissipate the energy in the sound waves before being able to exit the walls 48, 50. Because of this, the amplitude and/or frequency of the sound waves is altered/reduced, providing a muffling/quieting effect. To further muffle the sound of a generator foam may be coupled to each of the two walls 48 and 50 of the air dam 52. FIG. 5D is a cross section view of the side panel 42 taken across line 5D in FIG. 5A illustrating an inside view of the intake valves 44. FIG. 5E is a top view of the side panel 42.

Referring to FIG. 6A, a front view of another side panel 56 of the device is illustrated. The top panel of the device couples to the side panel at 58. Air exits the device through louvers 60. This side panel 56 may be coupled to another side panel by hinges or latches at location 62. FIG. 6B is a back view of the side panel 56. This is the view that would be seen inside the assembled device. The intake valves 64 are where air is pulled into the side panel from inside the box and eventually dispelled through the louvers 60 at the top of the side panel 56 illustrated in FIG. 6A. This location of the intake valves 64 increases sound attenuation of the generator noise because the sound waves from the generator are forced to bounce around inside the air dam of the side panel 56. FIG. 6C is a cross sectional view of the side panel 56 taken across lines 6C in FIG. 6A. FIG. 6C gives another view of the intake valves 64 and louvers 60 illustrated as 66. FIG. 6D is a top view of the side panel 56. The location of coupling the top panel of the device and side panel 56 is illustrated by 58. FIG. 6E is a left side view of the side panel 56. The location of coupling another side panel to this side panel 56 is illustrated by 56.

Figure 7A:
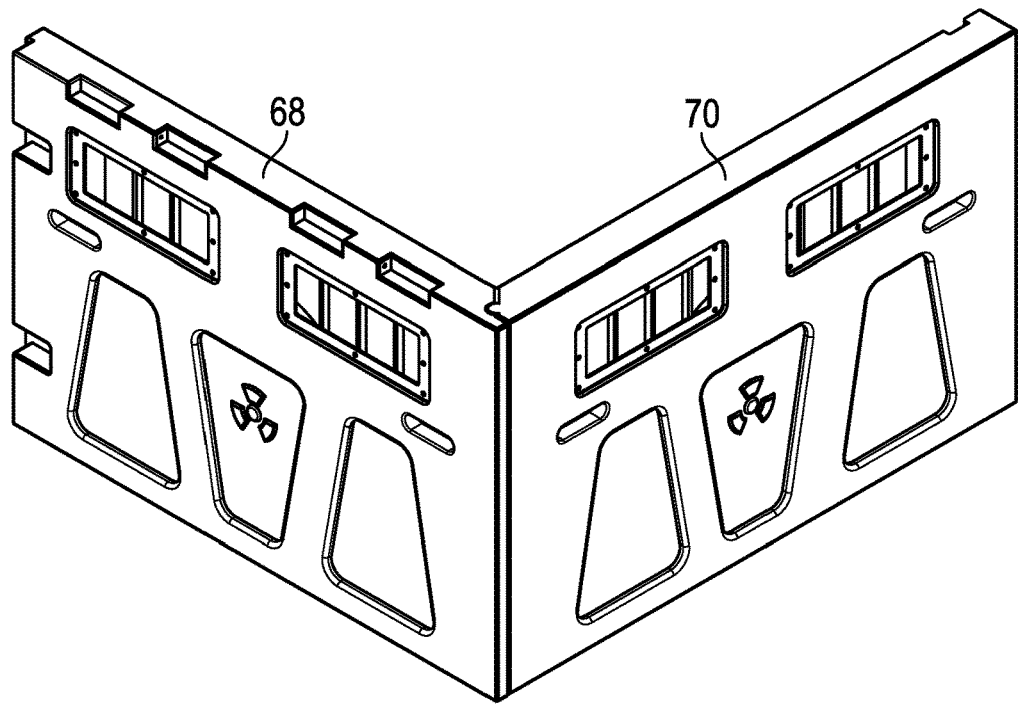
FIG. 7A is a perspective view of the side panels coupled together depicting the interlocking panel feature of the device.
Figure 7B:
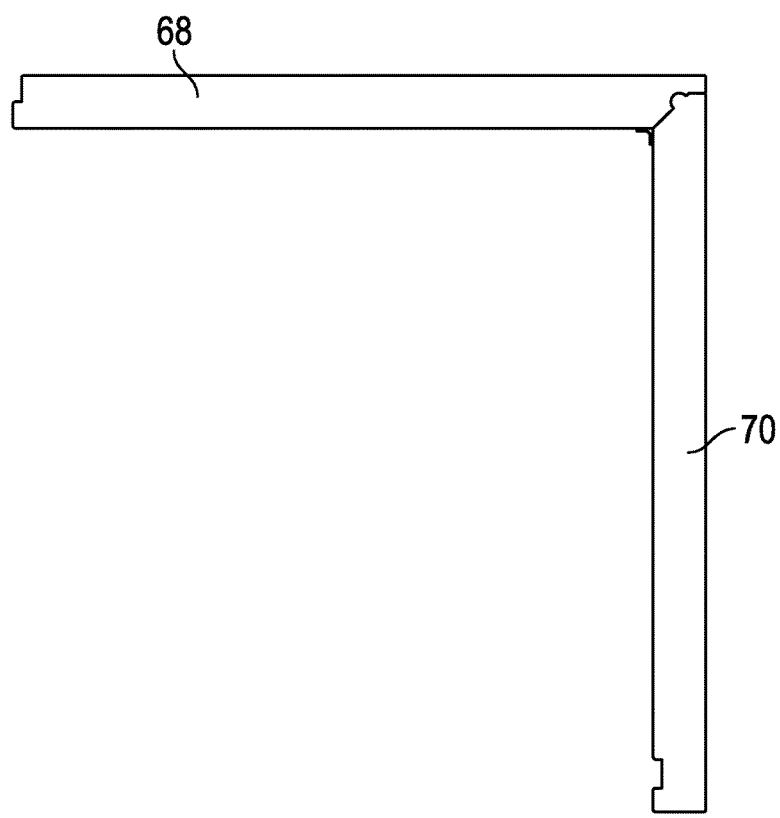
FIG. 7B is a top view of the interlocking feature of the side panels.

Referring to FIG. 7A, a perspective view of the interlocking feature of two side panels 68 and 70 is illustrated. FIG.

7B is a top view of the same interlocking feature of two side panels 68 and 70. As illustrated, the interlocking feature may involve a complementary male and female pair of features which may be present all along the edge of the two side panels 68, 70 or may be present at particular locations, or in alternating locations along the edge of the side panels. This interlocking feature may allow for easy assembly of the device.

Figure 8:
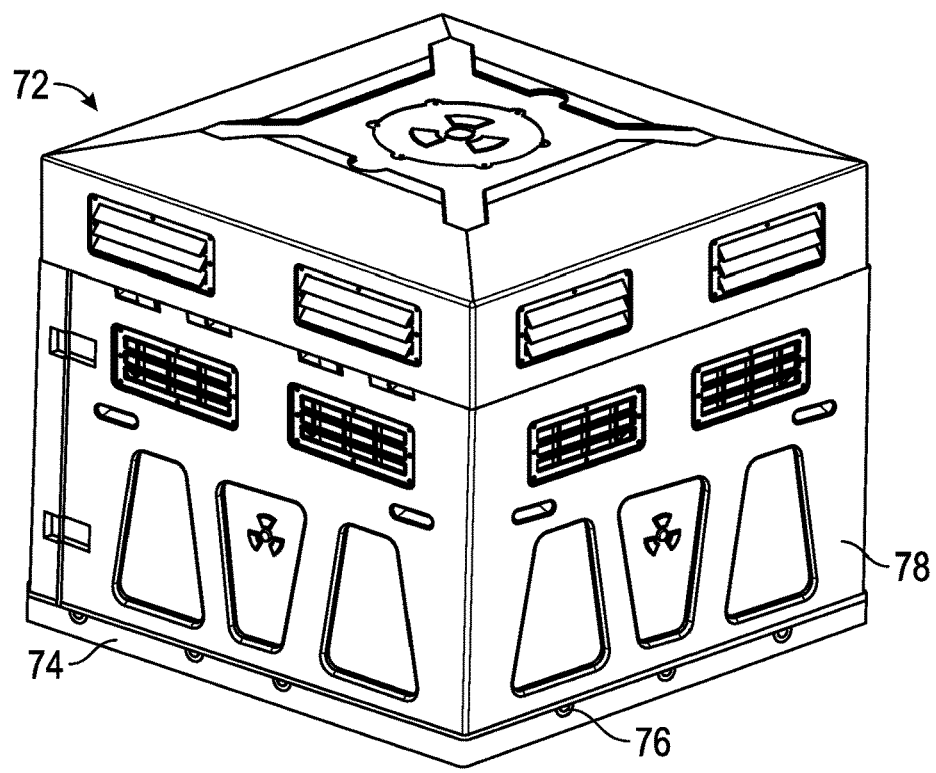
FIG. 8 is a perspective view of the device on a mat.

Referring to FIG. 8, a perspective view of the device 72 sitting on a mat 74 is illustrated. The mat 74 can be made of for example neoprene, rubber, plastic, or any combination thereof. The mat 74 has rounded cutouts 76 with removable inserts to allow cords to pass under corresponding rounded ends of the side panel 78. The mat may assist with water intrusion prevention, and may also assist with sound attenuation as well, depending on the material and thickness of the mat.

Figure 9:
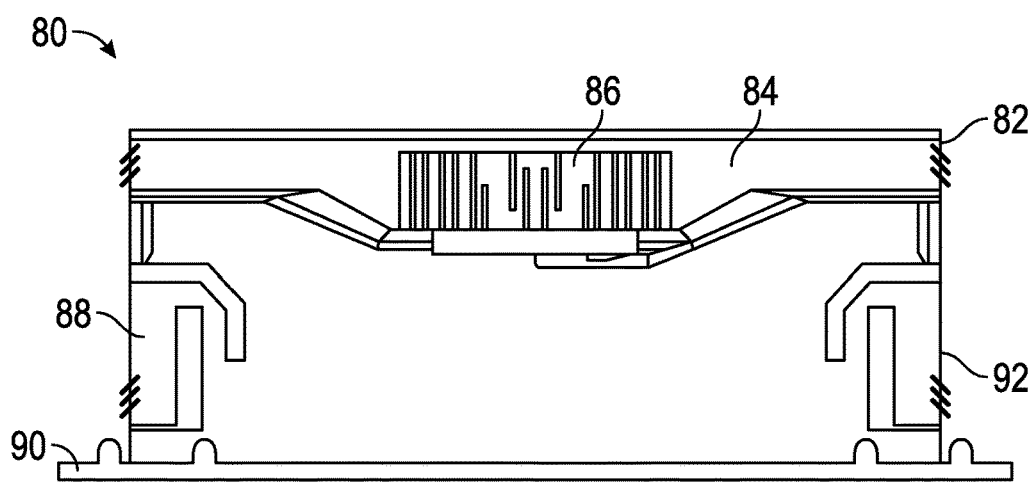
FIG. 9 is a sectional view of the device showing the air channels on the sides and top of the device.

Referring to FIG. 9, an inside view of the device 80 is illustrated. The top panel 82 of the device has a double wall structure that creates an air dam 84. The fan 86 provides ventilation for the generator within the device. In particular implementations, the fan 86 is a centrifugal fan. FIG. 9 also depicts the air dam 88 created in the side panels 92 of the device 86 by the double walled structure. The device 80 is sitting on another type of mat 90 that provides support for the side panels 92 of the device through grooves formed in the mat through two sets of flanges that extend upwardly from the mat and sized to receive the cross section of the side panels 92.

Figure 10A:
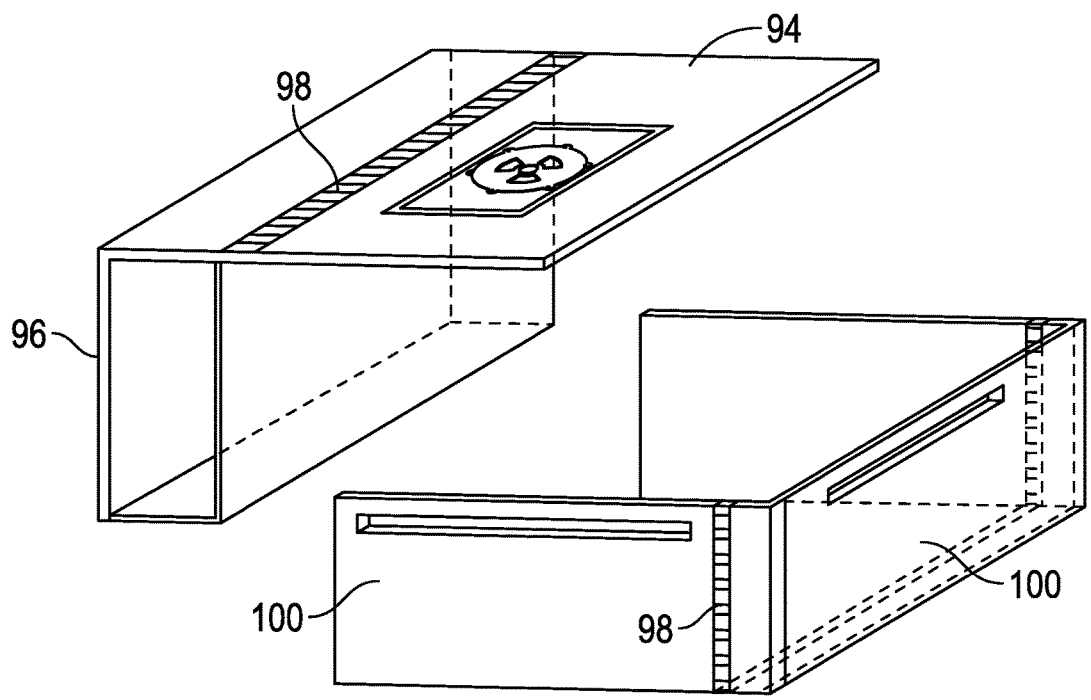
FIG. 10A break away view showing another implementation of the device.
Figure 10B:
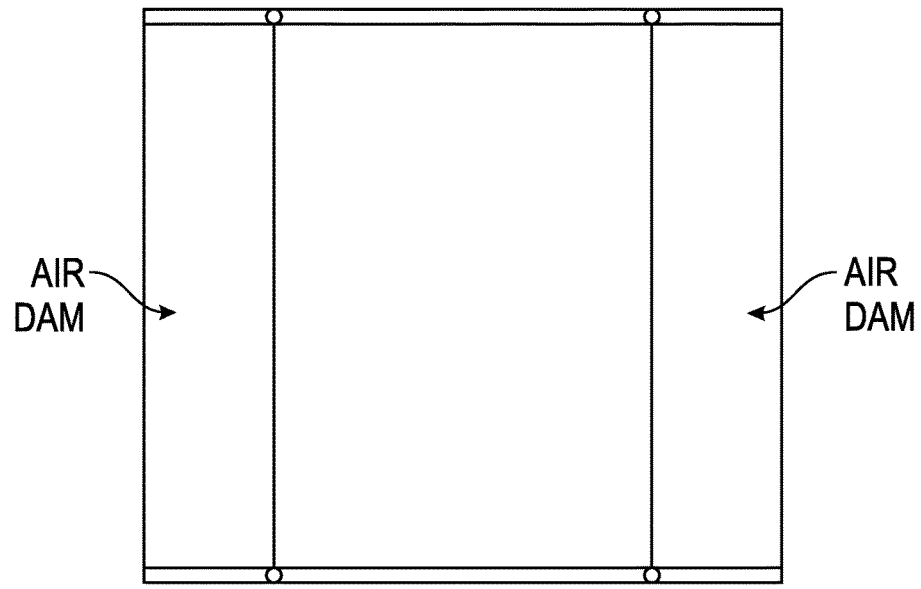
FIG. 10B is a blown up view of the walls of a side panel illustrating the air dam within the panel.

Referring to FIG. 10A, another implementation of the device is illustrated. The top panel 94 may be coupled to a side panel 96 through the use of hinges 98. Likewise the other side panels 100 may be coupled together through the use of hinges 98. The panels 96 and 94 and 100 may then be folded at the hinges for easier breakdown, transport and reassembly. FIG. 10B is a top see through view of the air dams created on either side of the device by the double wall structure of the side panels. In another implementation the space of the air dam in one wall of a side panel can be used to add a heat exchanger. The heat exchanger may be used to heat and purify water in remote locations, for example in third world countries without the ability to heat water. Also, in some implementations, the heat exchanger may be included in the top panel and used to capture heat from this location. In various implementations, the heat exchanger/heat exchanging pipes may be incorporated into the inner wall on the various panels. In some implementations, the inner wall may be a water wall formed of pipes designed to allow water to travel through the walls and capture heat from the generator.

Figure 11A:
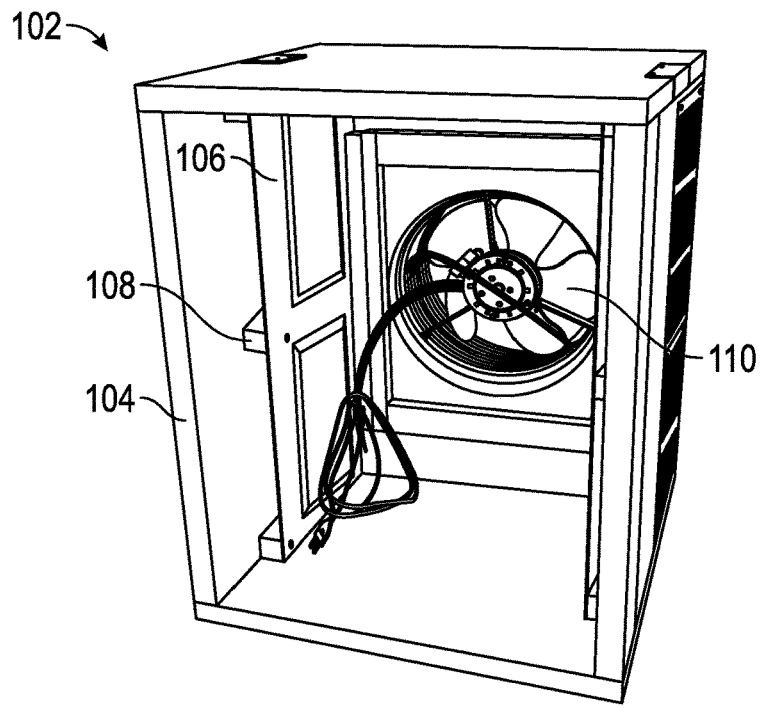
FIG. 11A is an inside view of the sound attenuating device showing spacing between the walls.
Figure 11B:
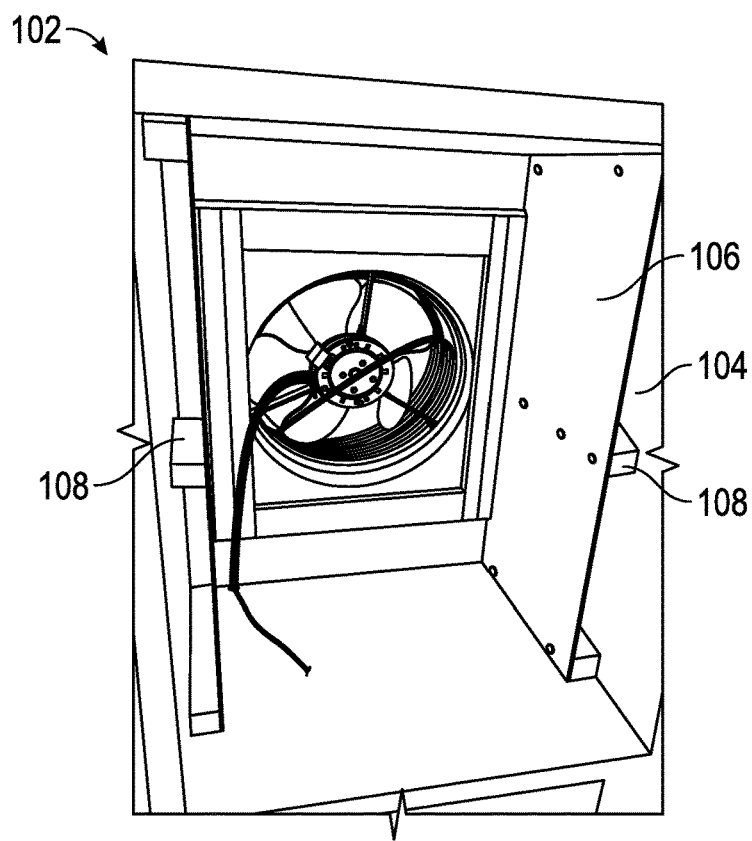
FIG. 11B is an inside view of the sound attenuating device showing the spacers added between the walls to increase the stability of the double walls.

Referring to FIG. 11A, an inside view of the device 102 is illustrated. This view shows two walls 104 and 106 of the side panel equally spaced by a spacer 108 added for stability (these help form the air dam). The under view of the fan 110 within the top panel of the device is also visible. FIG. 11B is another view of the inside of the device 102 showing the details of the double walled structure, two walls 106 and 104 supported by a spacer 108.

Figure 12A:
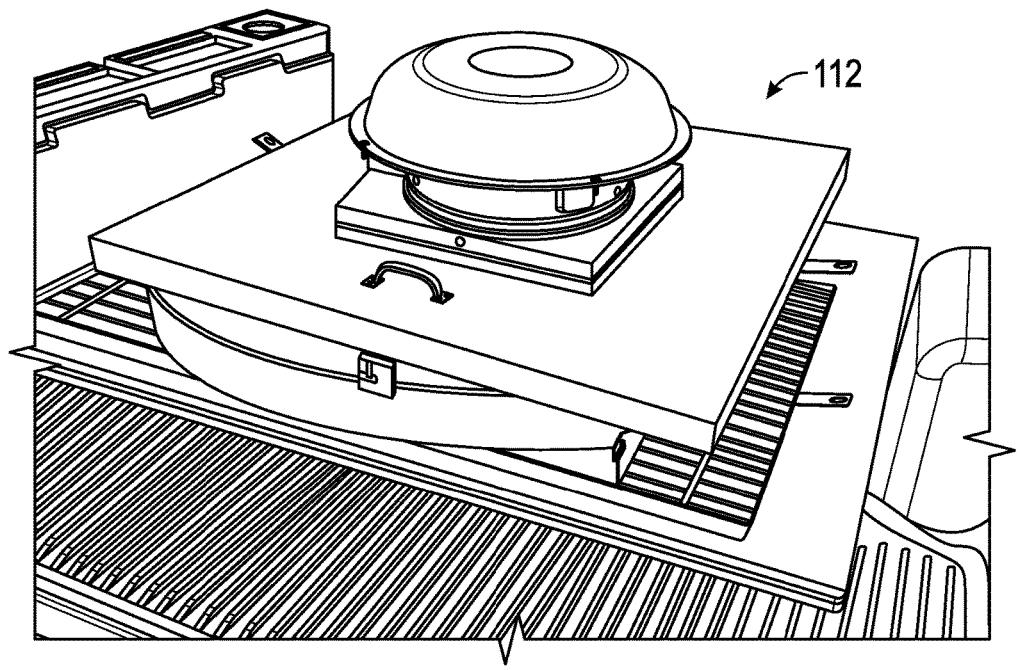
FIG. 12A is perspective view of the device folded down for transport.
Figure 12B:
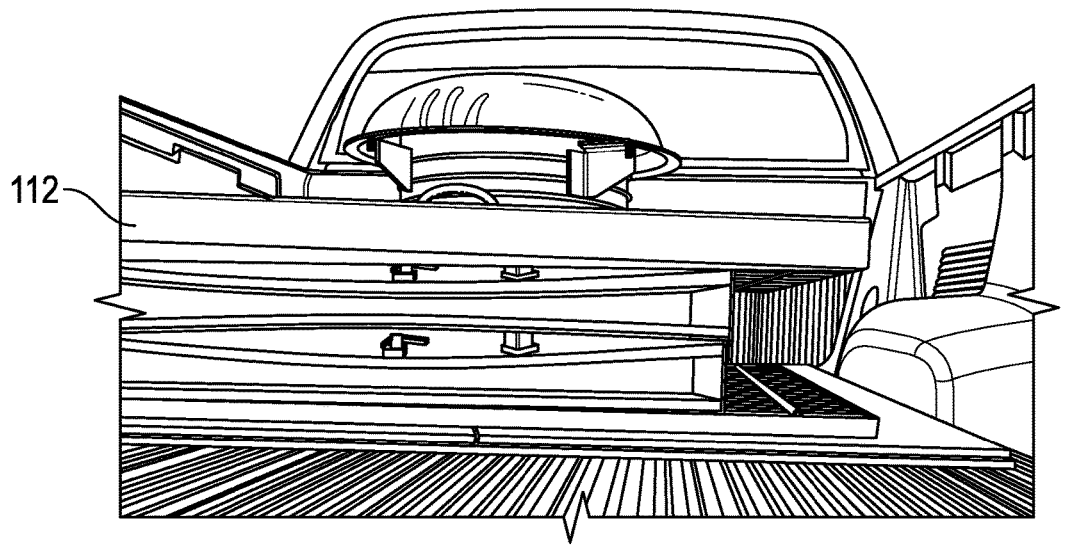
FIG. 12B is a front view of the device folded down for transport.

Referring to FIG. 12A and FIG. 12B, another implementation of the device 112 folded down for transport is illustrated. As can be seen, the walls of the device 112 are formed of pressed metal and designed to fit together with fasteners. When the walls and the top panel are all disconnected, the size of the unit decreases greatly and it may be transported much more easily. In this implementation, the side panels may be fastened together first, and then the top panel placed over them.

In places where the description above refers to particular implementations of a portable sound proofing device and implementing components, sub-components, methods and sub-methods, it should be readily apparent that a number of modifications may be made without departing from the spirit thereof and that these implementations, implementing components, sub-components, methods and sub-methods may be applied to other sound proofing devices.

What is claimed is:

1. A portable soundproofing enclosure comprising:
   four side panels coupled together; and
   a top panel coupled to each of the four side panels;
   a fan comprised in a housing, the housing coupled to and located above a top surface of the top panel;
   wherein the four side panels and the top panel form a cavity sized to fully enclose a portable generator;
   wherein at least two of the four side panels each comprise an air dam and a plurality of louvers configured to allow air to be drawn into the cavity into the air dam; and
   wherein the fan is positioned over an opening through the top panel to allow the fan to draw air from the cavity.

2. The portable soundproofing enclosure of claim 1, wherein the air dam is formed from two walls comprised in each of the at least two side panels.

3. The portable soundproofing enclosure of claim 2, further comprising foam coupled to each of the two walls of the air dam.

4. The portable soundproofing enclosure of claim 2, further comprising supports between the two walls of the air dam.

5. The portable soundproofing enclosure of claim 1, wherein the top panel and the four side panels are metal.

6. The portable soundproofing enclosure of claim 1, wherein the plurality of louvers are one of metal, plastic, and any combination thereof.

7. A portable soundproofing enclosure comprising:
   three or more side panels coupled together; and
   a top panel coupled to each of the three or more side panels, the three or more side panels and the top panel, the top panel comprising a fan;
   wherein the panels form a cavity sized to fully enclose a portable generator;
   wherein at least one of the three or more side panels comprises an air dam;
   wherein at least one of the side panels comprises a plurality of louvers configured to allow air to be drawn through the panel; and
   wherein the bottom edges of the sides are configured to rest on a mat.

8. The portable soundproofing enclosure of claim 7, wherein the air dam is formed from two walls comprised in each of the at least one side panel.

9. The portable soundproofing enclosure of claim 8, further comprising foam coupled to each of the two walls of the air dam.

10. The portable soundproofing enclosure of claim 8, further comprising supports between the two walls of the air dam.

11. The portable soundproofing enclosure of claim 7, wherein the side panels and the top panel are metal.

12. The portable soundproofing enclosure of claim 7, wherein the plurality of louvers are one of metal, plastic, and any combination thereof.

13. A portable soundproofing enclosure comprising:
   three or more side panels coupled together; and a top panel coupled to each of the three or more side panels, the three or more side panels and the top panel;

a fan comprised in a housing, the housing coupled to the top panel;

wherein the panels form a cavity sized to fully enclose a portable generator;

wherein at least one of the three or more side panels comprises an air dam;

wherein at least one of the side panels comprises a plurality of louvers configured to allow air to be drawn through the panel;

wherein the fan is positioned below the surface of the top panel in the top panel.

14. The portable soundproofing enclosure of claim 13, wherein the air dam is formed from two walls comprised in each of the at least one side panel.

15. The portable soundproofing enclosure of claim 14, further comprising foam coupled to each of the two walls of the air dam.

16. The portable soundproofing enclosure of claim 14, further comprising supports between the two walls of the air dam.

17. The portable soundproofing enclosure of claim 13, wherein the top panel and the side panels are metal.

18. The portable soundproofing enclosure of claim 13, wherein the plurality of louvers are one of metal, plastic, and any combination thereof.

* * * * *